(12) United States Patent
Lin et al.

(10) Patent No.: US 7,428,097 B1
(45) Date of Patent: Sep. 23, 2008

(54) POLED STRUCTURE WITH INHIBITION BLOCKS

(75) Inventors: Tze Chia Lin, Hsinchu (TW); Shang Ling Liu, Hsinchu (TW); Tso Lun Wu, Hsinchu (TW); Ming Hsien Chou, Hsinchu (TW)

(73) Assignee: HC Photonics Corp., Hsinchu (TW)

( * ) Notice: Subject to any disclaimer, the term of this patent is extended or adjusted under 35 U.S.C. 154(b) by 0 days.

(21) Appl. No.: 11/859,648

(22) Filed: Sep. 21, 2007

(51) Int. Cl.
 *G02F 1/355* (2006.01)
 *G02F 1/365* (2006.01)
(52) U.S. Cl. ...................................... 359/326; 359/332
(58) Field of Classification Search .......... 359/326–332
 See application file for complete search history.

(56) References Cited

U.S. PATENT DOCUMENTS 6,002,515 A 12/1999 Mizuuchi et al.
6,353,495 B1 3/2002 Mizuuchi et al.
2007/0258131 A1* 11/2007 Yamaguchi et al. ......... 359/326

\* cited by examiner

*Primary Examiner*—Hemang Sanghavi
(74) *Attorney, Agent, or Firm*—WPAT, PC; Anthony King

(57) ABSTRACT

A poled structure comprises a ferroelectric substrate having a top surface and a bottom surface, at least one inhibition block positioned in the ferroelectric substrate, an electrode structure including a first electrode and a second electrode on the top surface and a third electrode in a portion of the bottom surface between the first electrode and the second electrode and a plurality of inverted domains positioned outside of the inhibition block in the ferroelectric substrate. The ferroelectric substrate has a first polarization direction and a first crystal structure, the inhibition block has a second crystal structure different from the first crystal structure, and the inverted domains has a second polarization direction substantially opposite to the first polarization direction.

19 Claims, 11 Drawing Sheets

POLED STRUCTURE WITH INHIBITION BLOCKS

BACKGROUND OF THE INVENTION (A) Field of the Invention

The present invention relates to a poled structure, and more particularly, to a poled structure with inhibition blocks to prevent the occurrence of over-poling.

(B) Description of the Related Art

The poled structure having poled domains in a ferroelectric single crystal such as lithium niobate ($LiNbO_3$), lithium tantalite ($LiTaO_3$) and potassium titanyl phosphate ($KTiOPO_4$) may be widely used in the optical fields such as optical communication, optical storage and optical measurement. There are several methods for preparing the poled structure such as the proton-exchanging method, the electron beam-scanning method, the electric voltage applying method, etc.

U.S. Pat. No. 6,002,515 discloses a method for manufacturing a polarization inversion part on a ferroelectric crystal substrate. The polarization inversion part is prepared by steps of applying a voltage in the polarization direction of the ferroelectric crystal substrate to form a polarization inversion part, conducting a heat treatment for reducing an internal electric field generated in the substrate by the applied voltage, and then reinverting polarization in a part of the polarization inversion part by applying a reverse direction voltage against the voltage that was previously applied. In other words, the method for preparing a polarization inversion part disclosed in U.S. Pat. No. 6,002,515 requires performing the application of electric voltage twice.

U.S. Pat. No. 6,353,495 discloses a method for forming an optical waveguide element. The disclosed method forms a convex ridge portion having a concave portion on a ferroelectric single crystalline substrate, and a ferroelectric single crystalline film is then formed in the concave portion. A comb-shaped electrode and a uniform electrode are formed on a main surface of the ferroelectric single crystalline substrate, and electric voltage is applied to these two electrodes to form a ferroelectric domain-inverted structure in the film in the concave portion.

SUMMARY OF THE INVENTION

One aspect of the present invention provides a poled structure with inhibition blocks to prevent the occurrence of over-poling.

A poled structure according to this aspect of the present invention comprises a ferroelectric substrate having a top surface and a bottom surface, at least one inhibition block positioned in the ferroelectric substrate, an electrode structure including a first electrode and a second electrode on the top surface and a third electrode in a portion of the bottom surface between the first electrode and the second electrode and a plurality of inverted domains positioned outside of the inhibition block in the ferroelectric substrate. The ferroelectric substrate has a first polarization direction and a first crystal structure, the inhibition block has a second crystal structure different from the first crystal structure, and the inverted domains has a second polarization direction substantially opposite to the first polarization direction.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
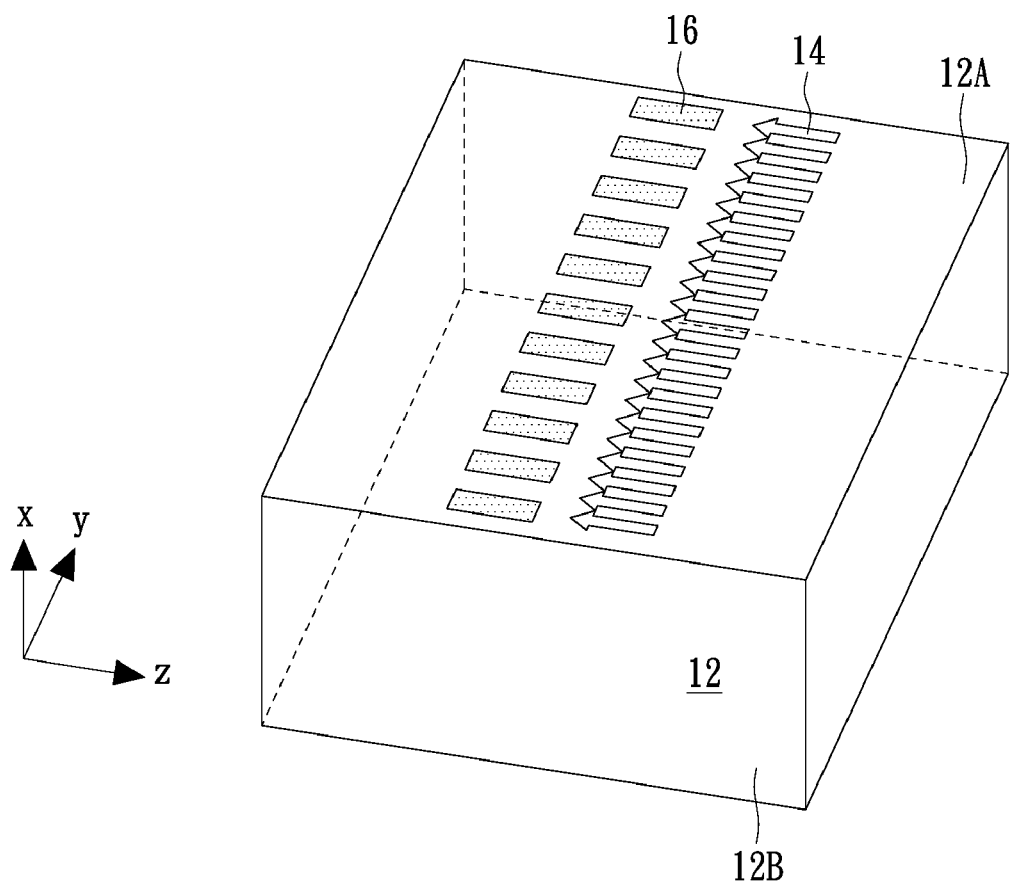
FIG. 1 to FIG. 5 illustrate a method for preparing a poled structure according to the first embodiment of the present invention.
Figure 2:
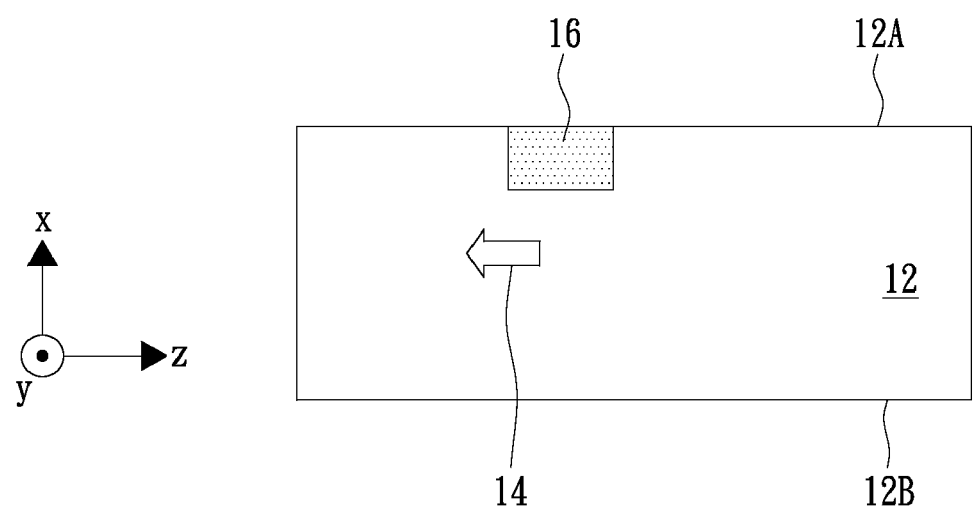

FIG. 1 to FIG. 5 illustrate a method for preparing a poled structure 10A according to the first embodiment of the present invention, wherein FIG. 2 is a cross-sectional view of FIG. 1. The method first provides a ferroelectric substrate 12 with a first polarization direction 14 and a first crystal structure, and the ferroelectric substrate 12 has a top surface 12A and a bottom surface 12B. Subsequently, a doping process, such as a proton-exchanging process or an implanting process, is then performed to form a plurality of inhibition blocks 16 in an upper portion of the ferroelectric substrate 12, and the inhibition blocks 16 have a second crystal structure different from the first crystal structure, as shown in FIG. 2.

Figure 3:
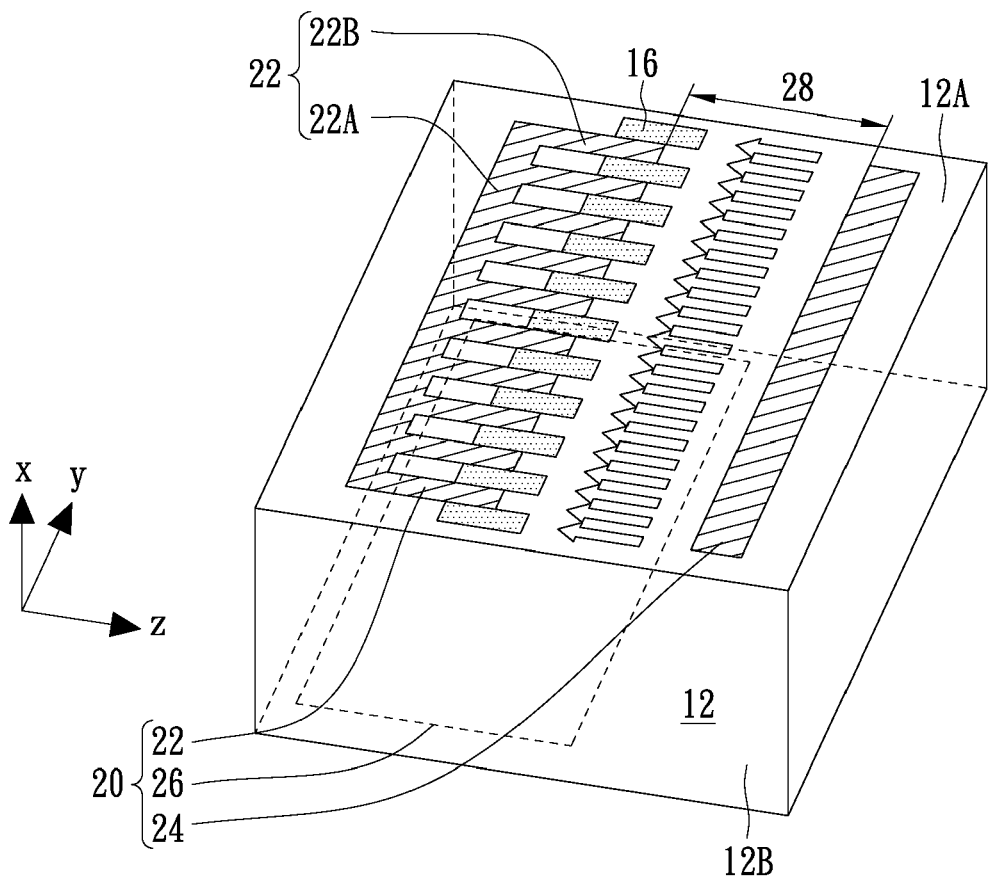
Figure 4:
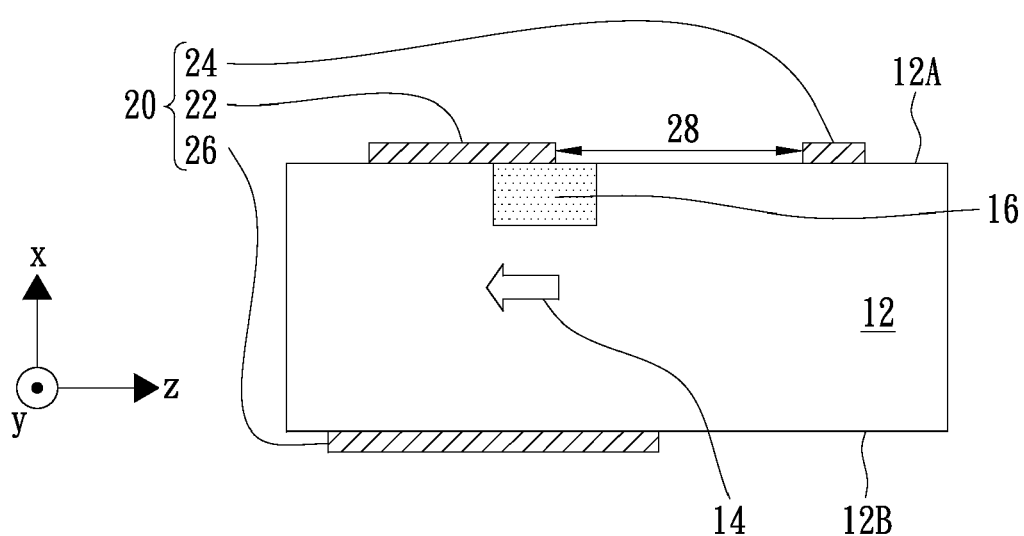

Referring to FIG. 3 and FIG. 4, fabrication processes, such as metal deposition and etching processes, are then performed to form an electrode structure 20 including a first electrode 22 and a second electrode 24 on the top surface 12A and a third electrode 26 in a portion of the bottom surface 12B between the first electrode 22 and the second electrode 24. In particular, the first electrode 22 is a positive electrode including a body 22A and a plurality of combs 22B, the second electrode 24 is a strip-shaped negative electrode, and the doping process forms the inhibition blocks 16 between the combs 22B of the first electrode 22. Furthermore, the first electrode 22 and the second electrode 24 are separated by a poling area 28, and the doping process preferably forms the inhibition blocks 16 covering a portion of the poling area 16 near the first electrode 22. Optionally, the ferroelectric substrate 12 may include a trench (not shown in the drawings) on the top surface 12A.

Figure 5:
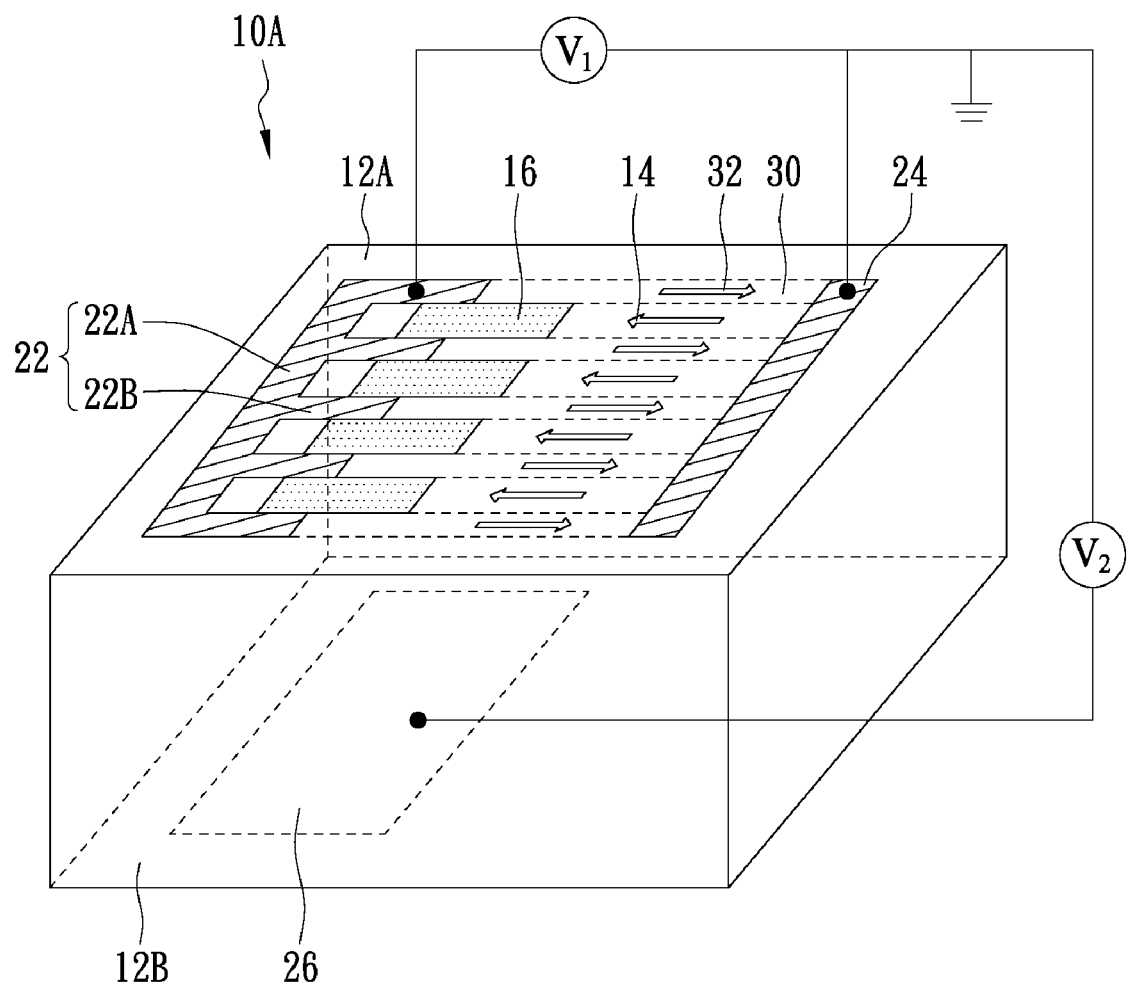

Referring to FIG. 5, a poling process is performed on the electrode structure 20 to form a plurality of inverted domains 30 outside of the inhibition block 16 in the ferroelectric substrate 12, and the inverted domains 30 have a second polarization direction 32 substantially opposite to the first polarization direction 14. Preferably, the poling process is performed by applying a first voltage to the first electrode 22, a second voltage to the second electrode 24 and a third voltage to the third electrode 26. Preferably, the first voltage is higher than the second voltage, the first voltage is higher than the third voltage, and the third voltage is higher than the second voltage or equals to the second voltage.

In particular, the inhibition blocks 16 near the first electrode 22 can prevent the inverted domains 30 from merging in the ferroelectric substrate 12 between the first electrode 22 and the second electrode 24 such that uniformly deeper periodic inverted domain 30 can be prepared in the ferroelectric substrate 12. The purpose of the doping process is to change the original crystal structure of the ferroelectric substrate 12, whose polarization direction cannot be reversed by the subsequent poling process so that the enlarging of the inverted domains 30 due to over-poling can be inhibited.

Figure 6:
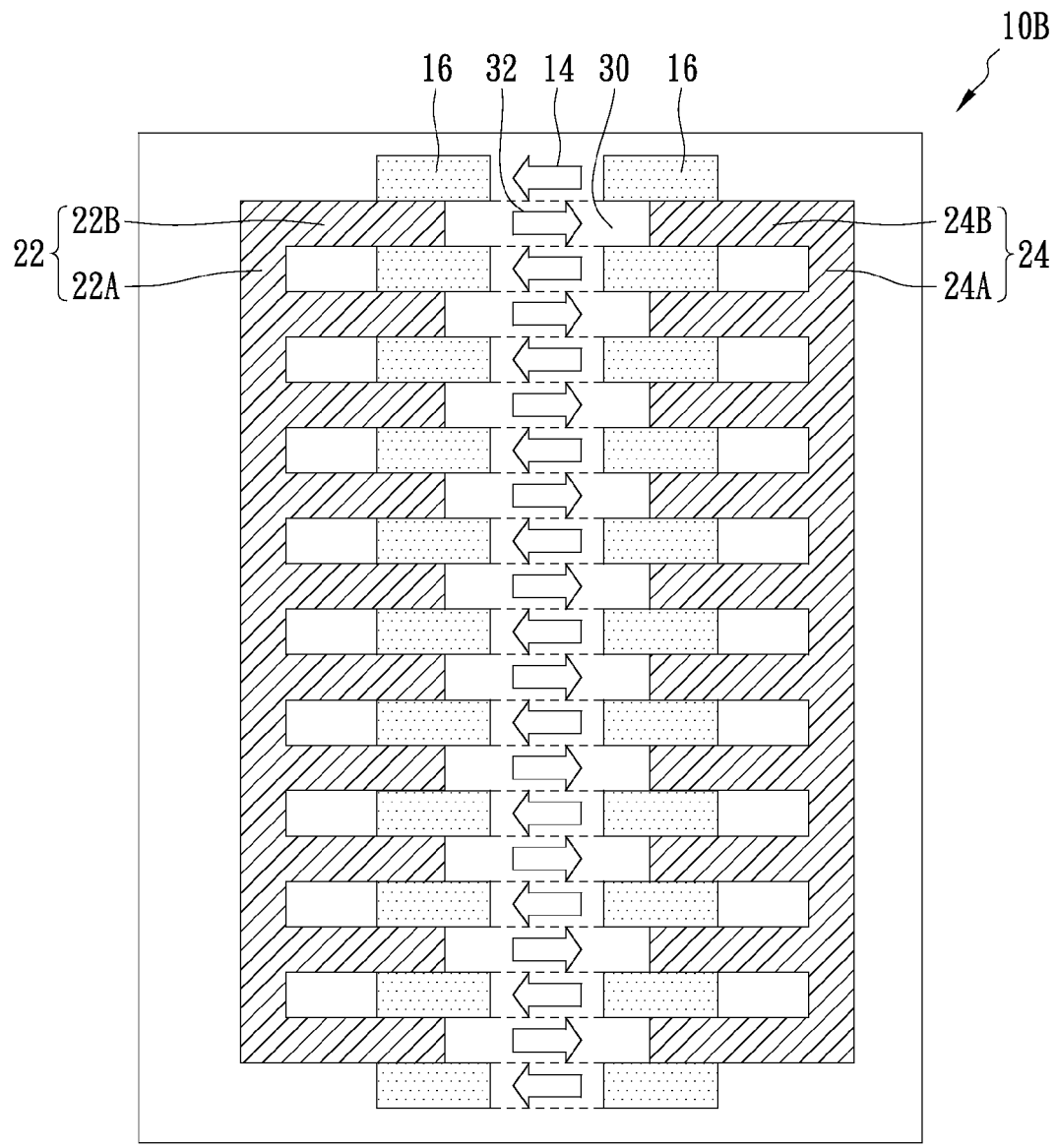
FIG. 6 and FIG. 7 illustrate a poled structure according to the second embodiment of the present invention.
Figure 7:
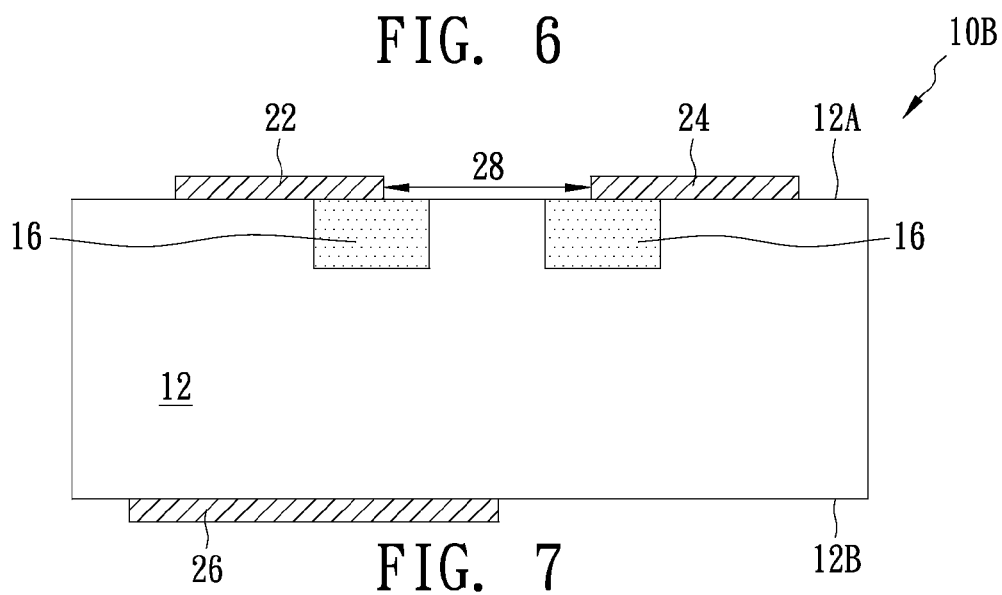

FIG. 6 and FIG. 7 illustrate a poled structure 10B according to the second embodiment of the present invention. FIG. 6 is a top view of the poled structure 10B and FIG. 7 is a cross-sectional view of the poled structure 10B. Compared with the prepared poled structure 10A in FIG. 5, the first electrode 22 of the prepared poled structure 10B includes a plurality of combs 22B, the second electrode 24 includes a plurality of combs 24B, and the doping process forms a plurality of inhibition blocks 16 between the combs 22B of the first electrode 22 and between the combs 24B of the second electrode 24. In particular, the first electrode 22 and the second electrode 24 are separated by a poling area 28, and the doping process forms the inhibition blocks 16 covering a portion of the poling area 28. The inhibition blocks 16 between the combs 22B, 24B of the first electrode 22 and the second electrode 24 can prevent the inverted domain 30 from merging in the ferroelectric substrate 12 between the first electrode 22 and the second electrode 24 such that a uniformly deeper periodic inverted domain 30 can be prepared in the ferroelectric substrate 12.

Figure 8:
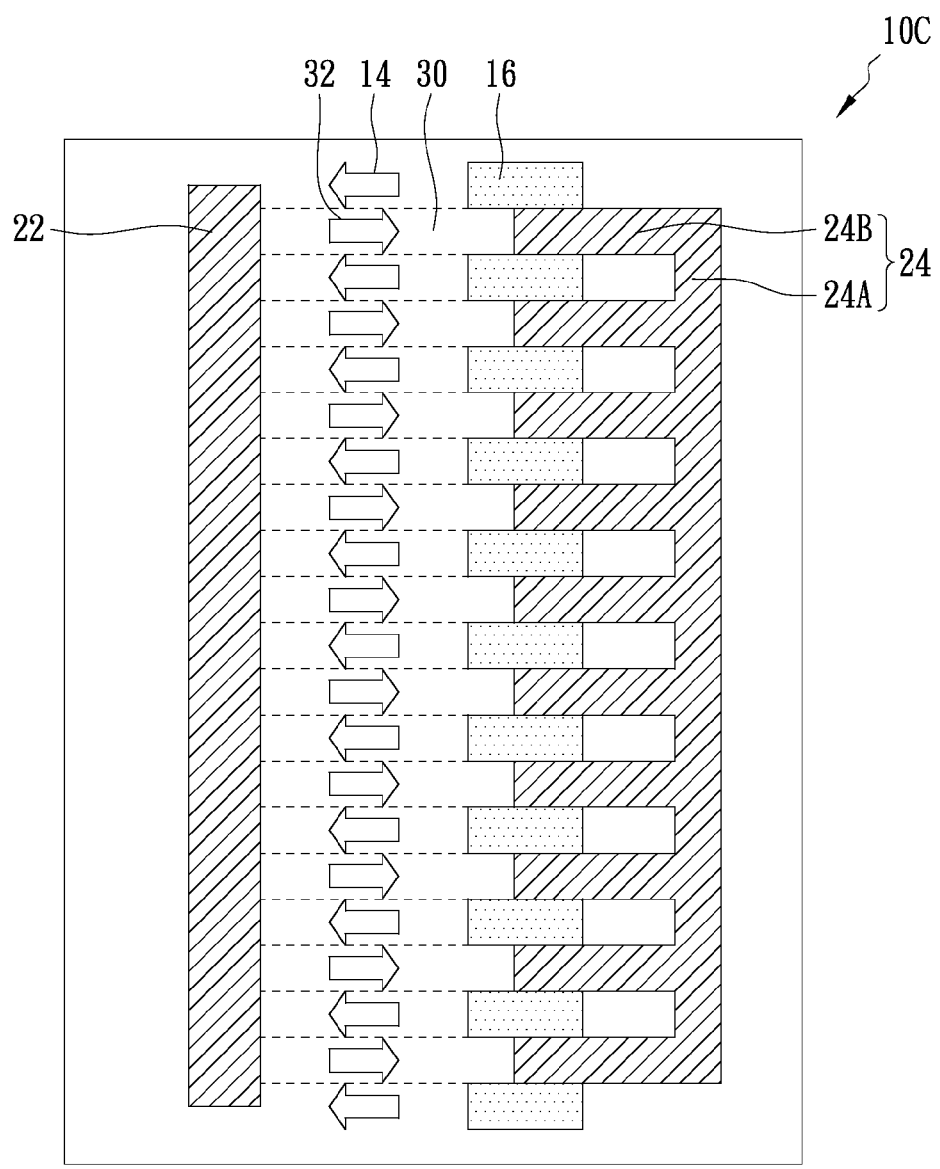
FIG. 8 and FIG. 9 illustrate a poled structure according to the third embodiment of the present invention.
Figure 9:
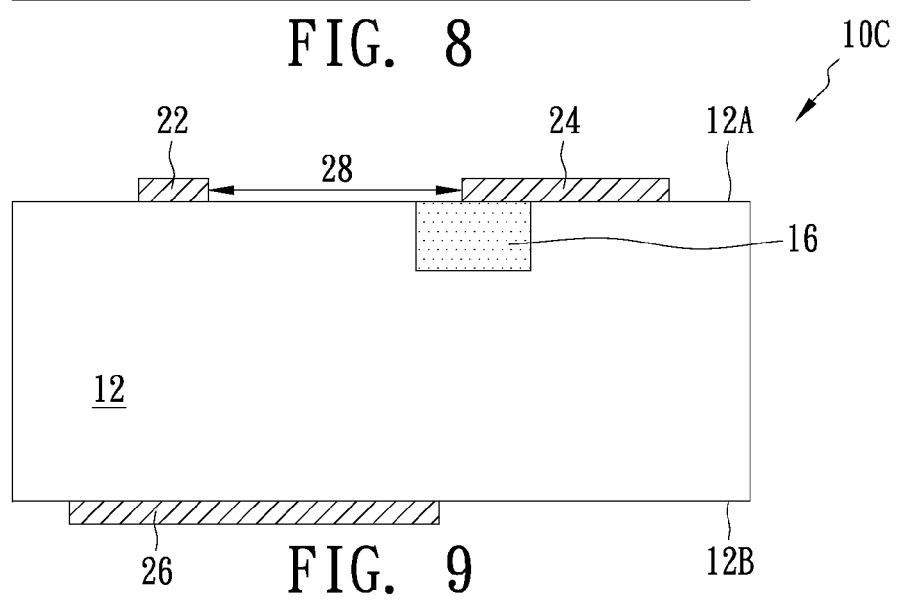

FIG. 8 and FIG. 9 illustrate a poled structure 10C according to the third embodiment of the present invention. FIG. 8 is a top view of the poled structure 10C and FIG. 97 is a cross-sectional view of the poled structure 10C. Compared with the prepared poled structure 10A in FIG. 5, the first electrode 22 of the prepared poled structure 10C is a strip-shaped positive electrode, the second electrode 24 is a negative electrode including a plurality of combs 24B, and the doping process forms the inhibition blocks 16 between the combs 24B of the second electrode 24. In particular, the first electrode 22 and the second electrode 24 are separated by a poling area 28, and the doping process forms the inhibition blocks 16 covering a portion of the poling area 28. The inhibition blocks 16 between the combs 24B of the second electrode 24 can prevent the inverted domain 30 from merging in the ferroelectric substrate 12 between the first electrode 22 and the second electrode 24 such that a uniformly deeper periodic inverted domain 30 can be prepared in the ferroelectric substrate 12.

Figure 10:
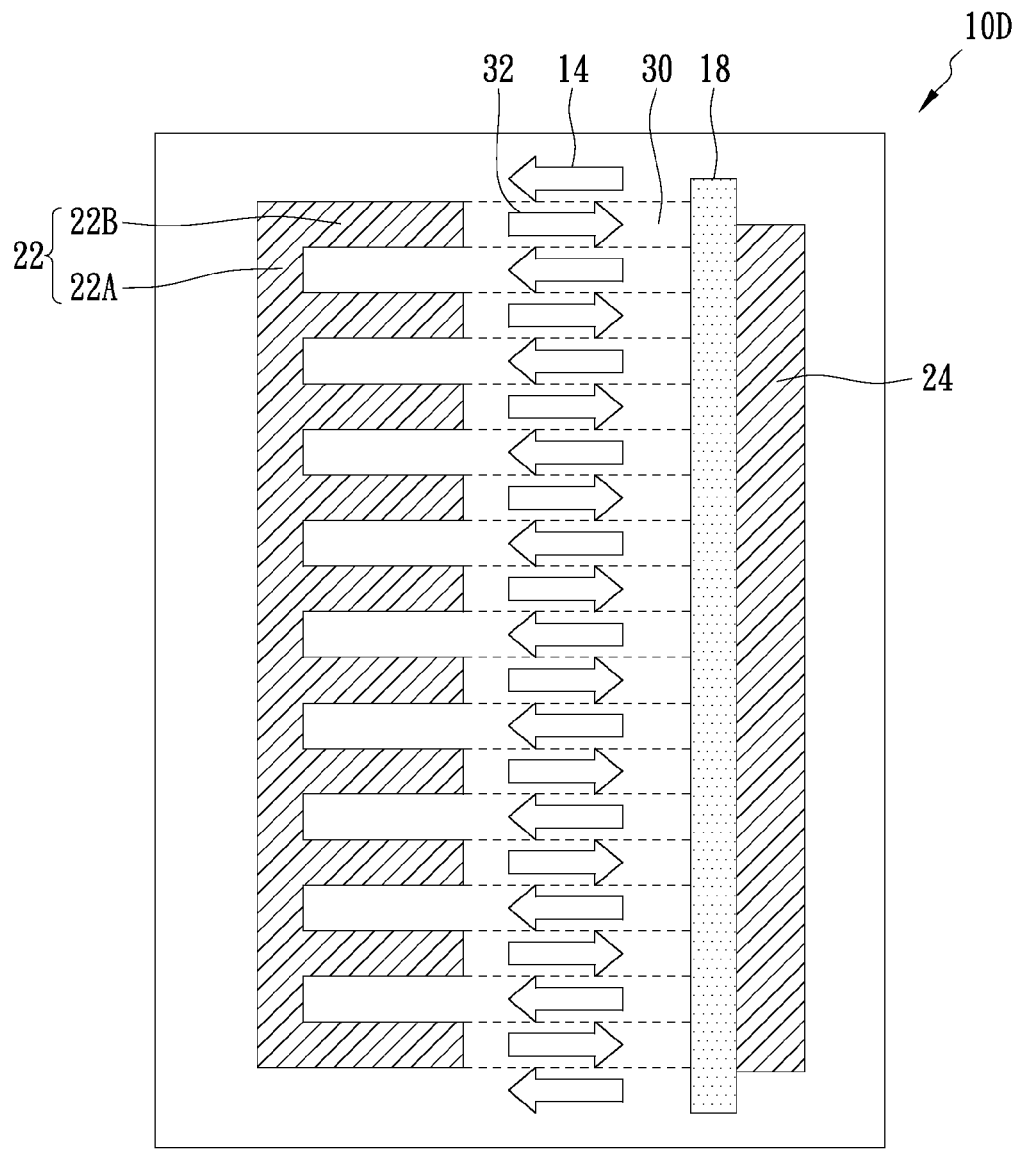
FIG. 10 and FIG. 11 illustrate a poled structure according to the fourth embodiment of the present invention.
Figure 11:
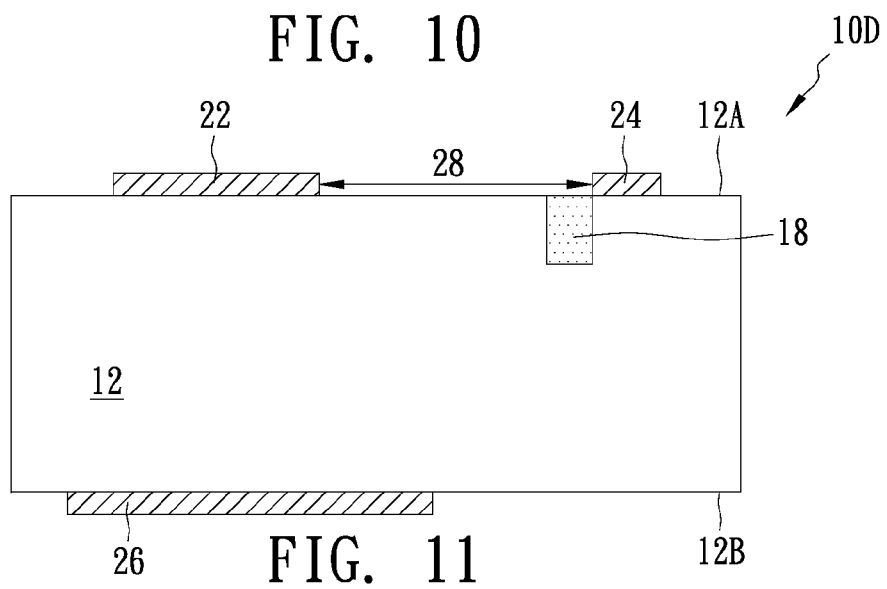

FIG. 10 and FIG. 11 illustrate a poled structure 10D according to the fourth embodiment of the present invention. FIG. 10 is a top view of the poled structure 10D and FIG. 11 is a cross-sectional view of the poled structure 10D. Compared with the prepared poled structure 10A in FIG. 5, the first electrode 22 of the poled structure 10D is a positive electrode including a plurality of combs 22B, the second electrode 24 is a strip-shaped negative electrode, and the doping process forms a strip-shaped inhibition block 18 near the second electrode 24. Preferably, the first electrode 22 and the second electrode 24 are separated by a poling area 28, and the doping process forms the strip-shaped inhibition block 18 covering a portion of the poling area 28 near the second electrode 24. The strip-shaped inhibition block 18 in front of the strip-shaped negative electrode (the second electrode 24) can prevent the second electrode 24 from the occurrence of the leakage when the inverted domains 30 reach to the strip-shaped negative electrode 24 from the positive electrode 22, since the doping process changes the crystal structure of the strip-shaped inhibition block 18, whose polarization is not easily reversed.

Figure 12:
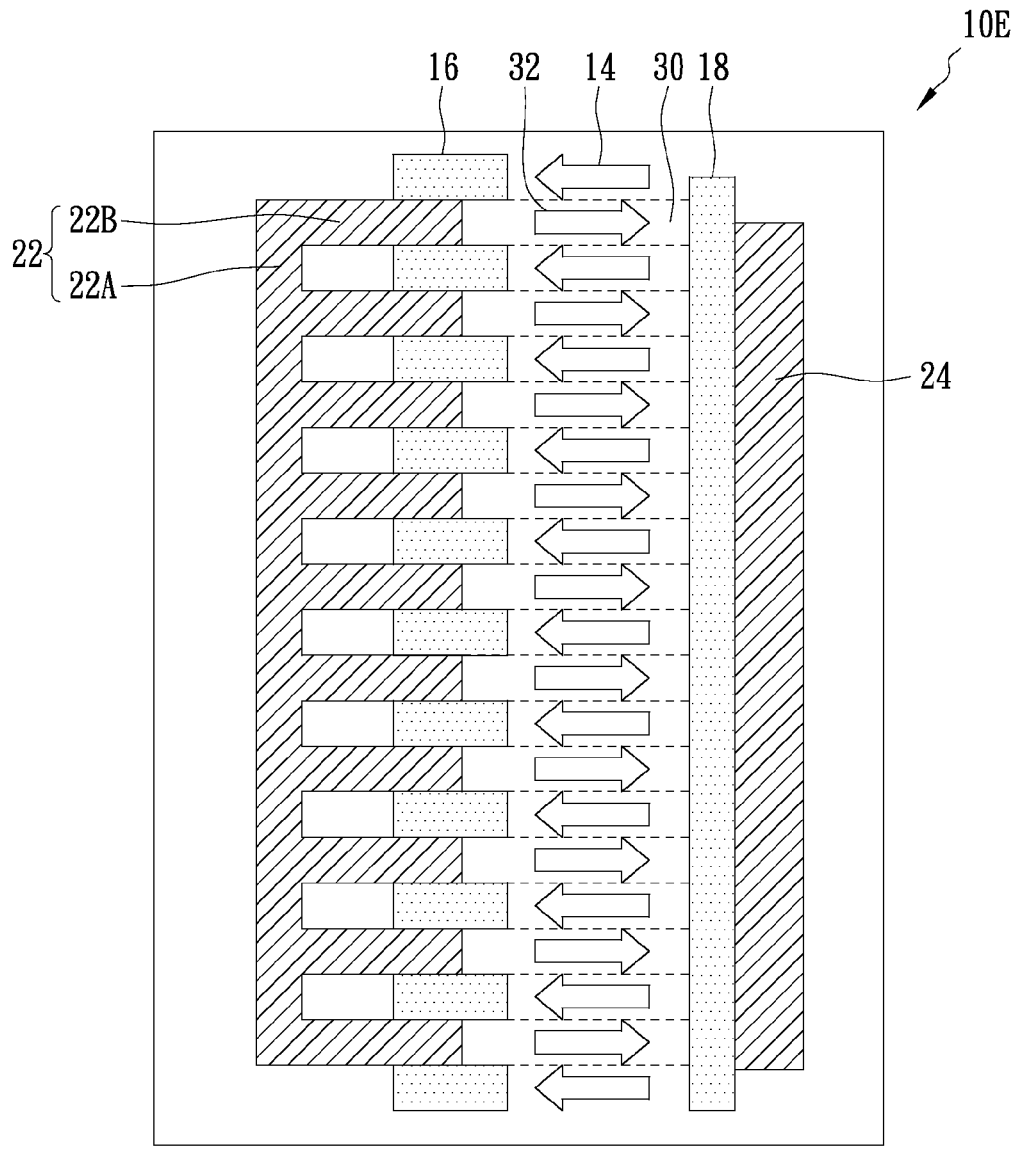
FIG. 12 and FIG. 13 illustrate a poled structure according to the fifth embodiment of the present invention.
Figure 13:
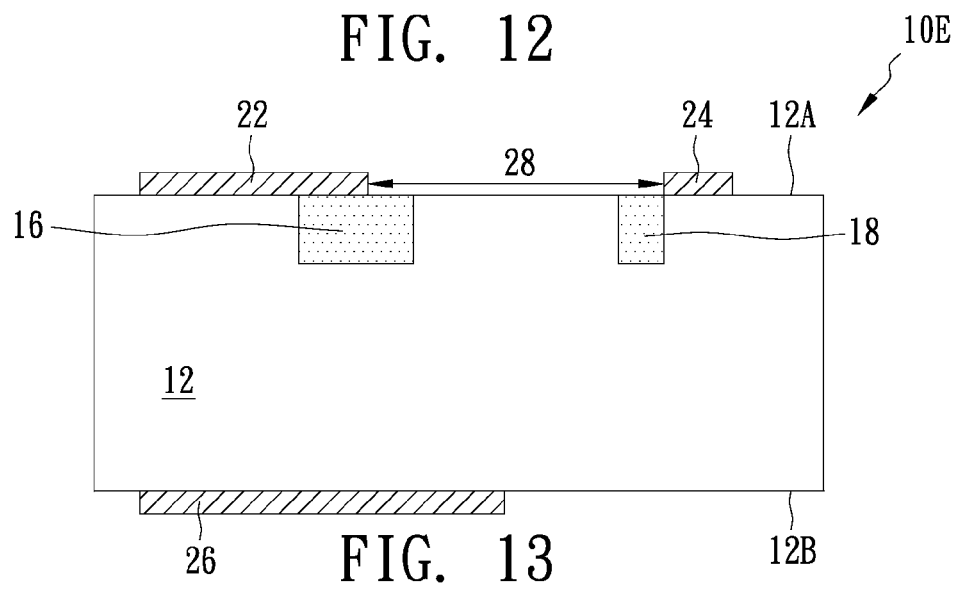

FIG. 12 and FIG. 13 illustrate a poled structure 10E according to the fifth embodiment of the present invention. FIG. 12 is a top view of the poled structure 10E and FIG. 13 is a cross-sectional view of the poled structure 10E. Compared with the prepared poled structure 10A in FIG. 5, the first electrode 22 of the poled structure 10E is a positive electrode including a plurality of combs 22B, the second electrode 24 is a strip-shaped negative electrode, and the doping process forms a plurality of inhibition blocks 16 between the combs 22B and a strip-shaped inhibition block 18 near the second electrode 24. Preferably, the first electrode 22 and the second electrode 24 are separated by a poling area 28, and the doping process forms the inhibition blocks 16 covering a portion of the poling area near the first electrode 22 and the strip-shaped inhibition block 18 covering a portion of the poling area 28 near the second electrode 24. Due to the application of the inhibition blocks 16 and the strip-shaped inhibition block 18, this embodiment can not only inhibit over-poling but also prevent leakage, and the inverted domains 30 can be prepared more uniformly.

Figure 14:
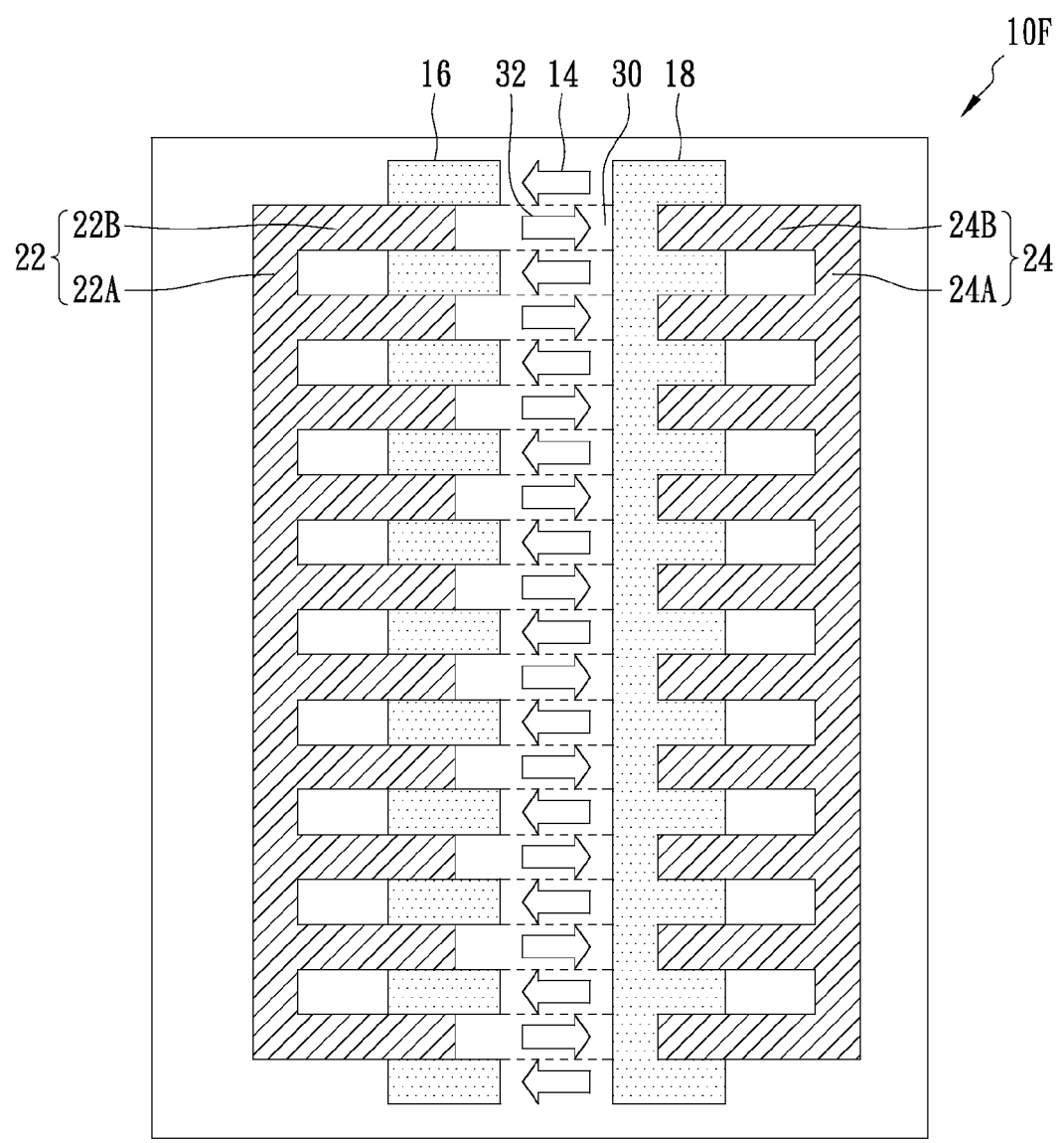
FIG. 14 and FIG. 15 illustrate a poled structure according to the sixth embodiment of the present invention.
Figure 15:
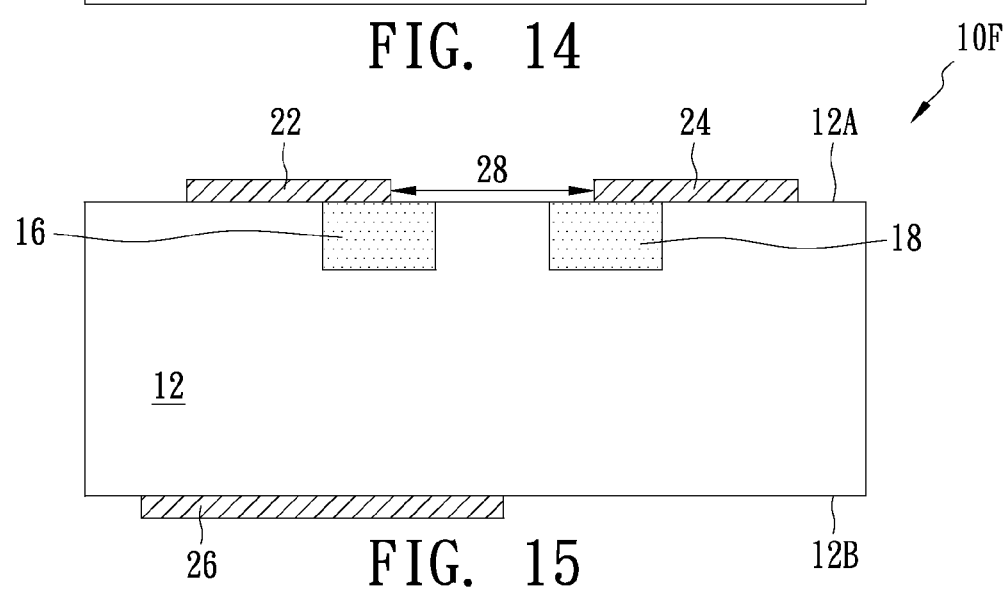

FIG. 14 and FIG. 15 illustrate a poled structure 10F according to the sixth embodiment of the present invention. FIG. 14 is a top view of the poled structure 10F and FIG. 15 is a cross-sectional view of the poled structure 10F. Compared with the prepared poled structure 10A in FIG. 5, the first electrode 22 of the poled structure 10F includes a plurality of combs 22B, the second electrode 24 includes a plurality of combs 24B, and the doping process forms a plurality of inhibition blocks 16 between the combs 22B of the first electrode 22 and a strip-shaped inhibition block 18 near the second electrode 24. Preferably, the first electrode 22 and the second electrode 24 are separated by a poling area 28, and the doping process forms the inhibition blocks 16 covering a portion of the poling area 28 near the first electrode 22 and the strip-shaped inhibition block 18 covering a portion of the poling area 28 near the second electrode 24. Due to the application of the inhibition blocks 16 and the strip-shaped inhibition block 18, this embodiment can not only inhibit over-poling but also prevent leakage, and the inverted domains 30 can be prepared more uniformly.

Figure 16:
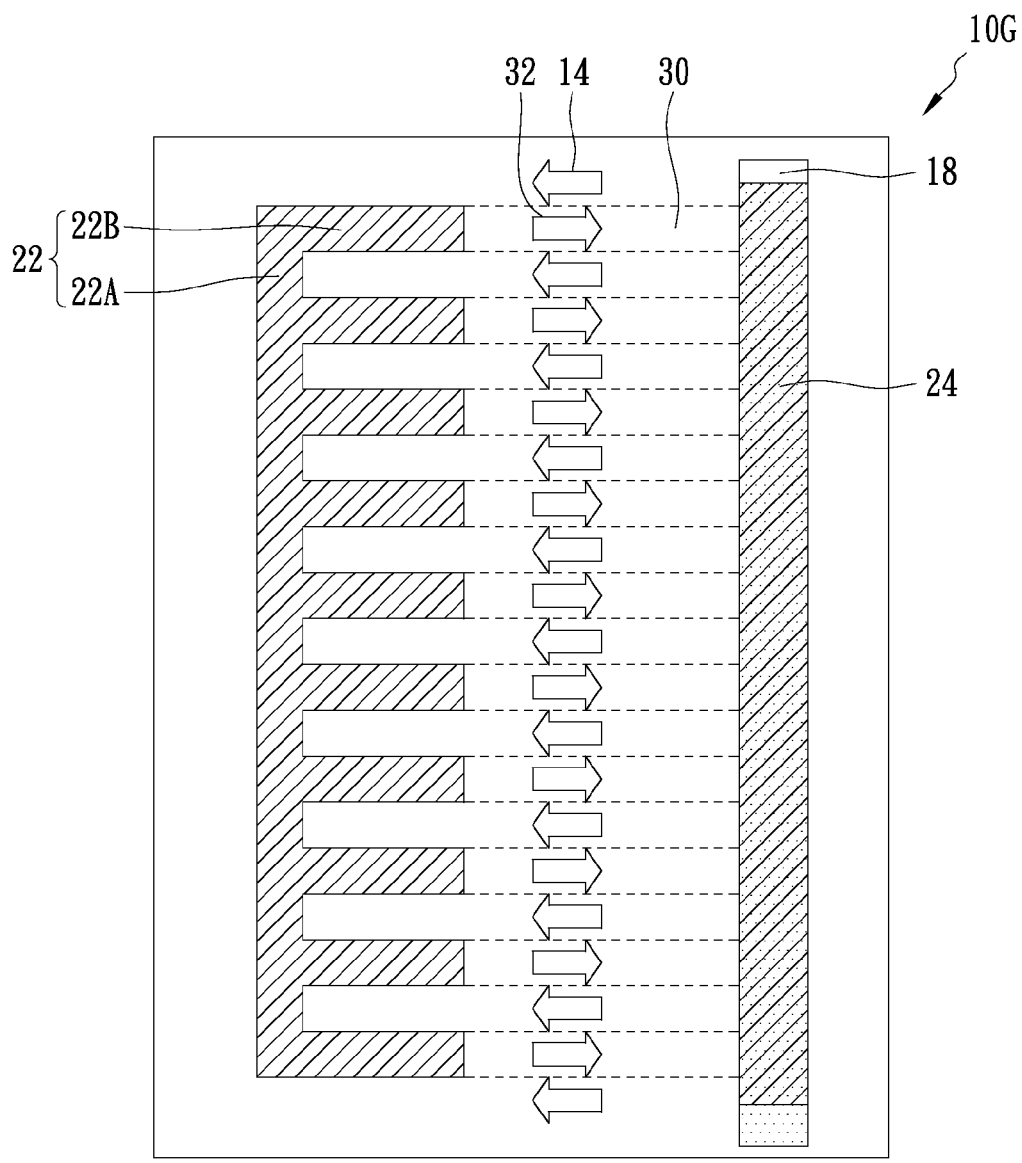
FIG. 16 and FIG. 17 illustrate a poled structure according to the seventh embodiment of the present invention.
Figure 17:
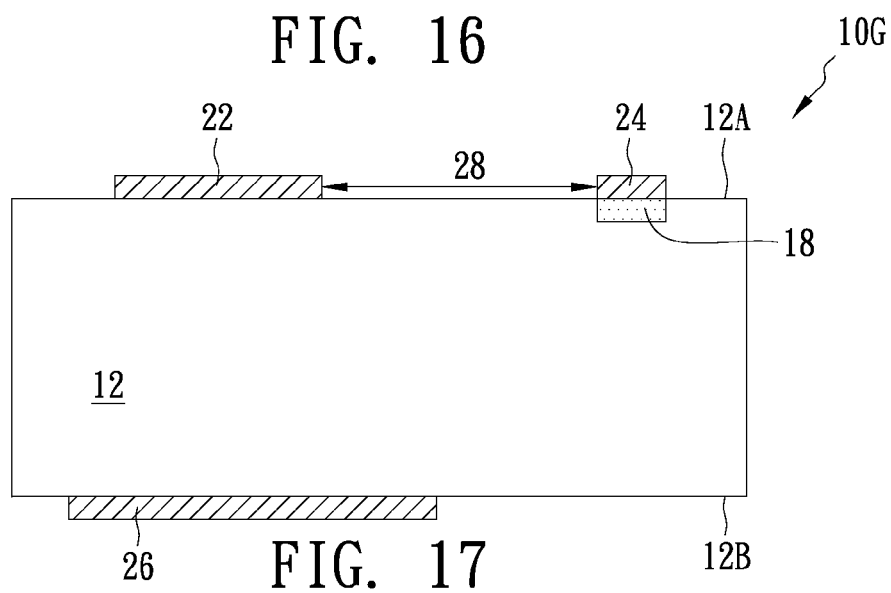

FIG. 16 and FIG. 17 illustrate a poled structure 10G according to the seventh embodiment of the present invention. FIG. 16 is a top view of the poled structure 10G and FIG. 17 is a cross-sectional view of the poled structure 10G. Compared with the prepared poled structure 10A in FIG. 5, the first electrode 22 of the poled structure 10G includes a plurality of combs 22B, the doping process forms a strip-shaped inhibition block 18 in the ferroelectric substrate 12, and the second electrode 24 is formed on the strip-shaped inhibition block 18. In particular, the strip-shaped inhibition block 18 under the strip-shaped negative electrode 24 supports the conductivity and serves as the extension of the strip-shaped negative electrode 24, which can increase the internal electrical field as the poling process is performed by applying voltages to the positive electrode 22 and the negative electrode 24, and the increased internal electrical field is contributory to the formation of the inverted domains 30.

Figure 18:
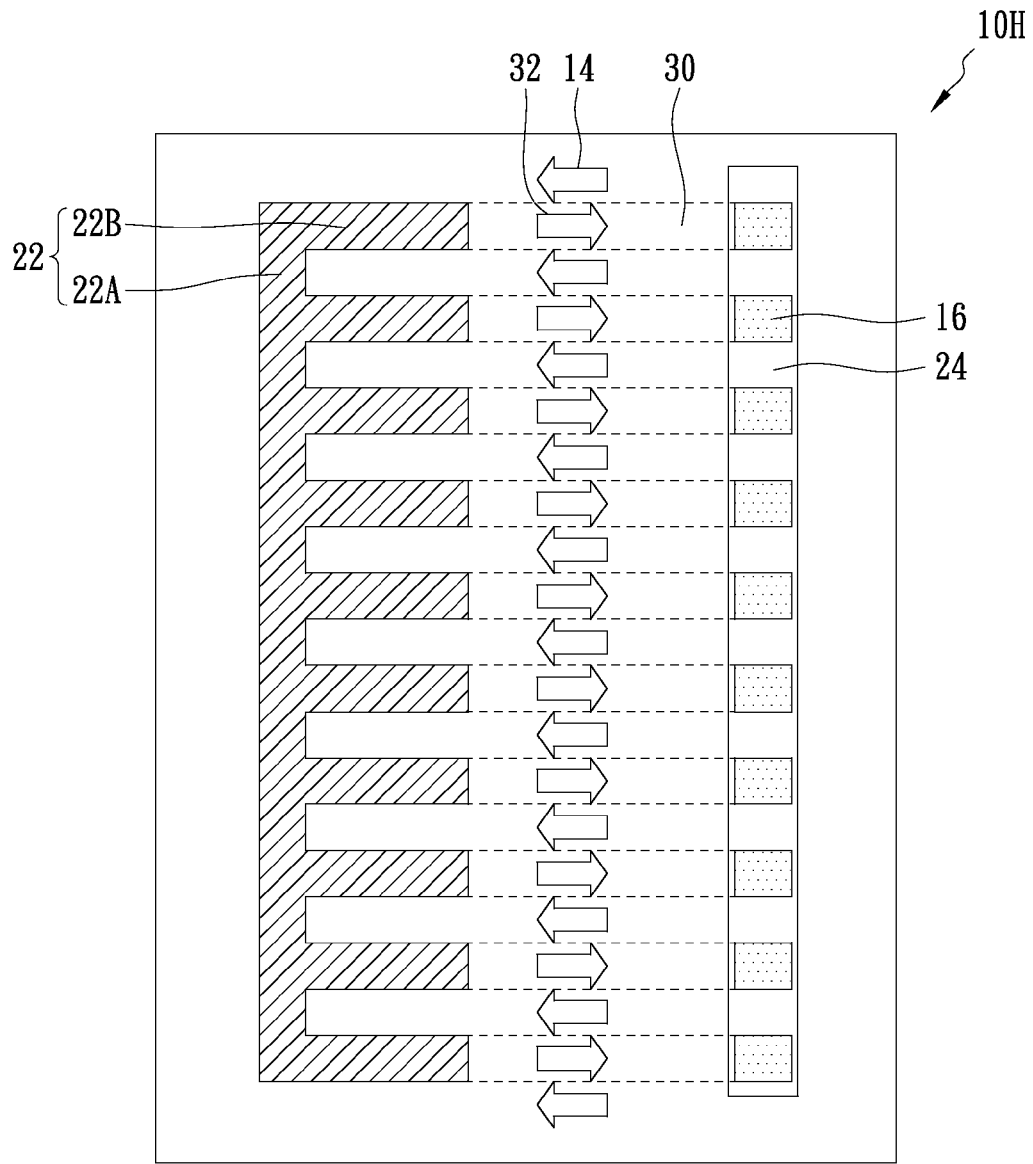
FIG. 18 and FIG. 19 illustrate a poled structure according to the eighth embodiment of the present invention.
Figure 19:
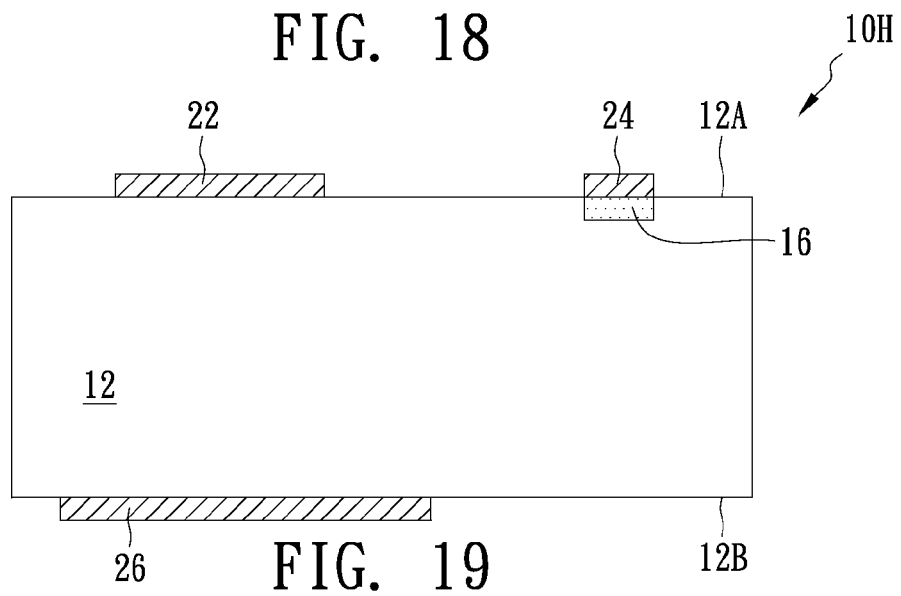

FIG. 18 and FIG. 19 illustrate a poled structure 10H according to the eighth embodiment of the present invention. FIG. 18 is a top view of the poled structure 10H and FIG. 19 is a cross-sectional view of the poled structure 10H. Compared with the prepared poled structure 10A in FIG. 5, the first electrode 22 of the poled structure 10H includes a plurality of combs 22B, the doping process forms a plurality of inhibition blocks 16 in the ferroelectric substrate 12, and the second electrode 24 is formed on the inhibition blocks 16. In particular, the inhibition block 16 under the strip-shaped negative electrode 24 supports the conductivity and serves as the extension of the strip-shaped negative electrode 24, which can increase the internal electrical field as the poling process is performed by applying voltages to the positive electrode 22 and the negative electrode 24, and the increased internal electrical field is contributory to the formation of the inverted domains 30.

Figure 20:
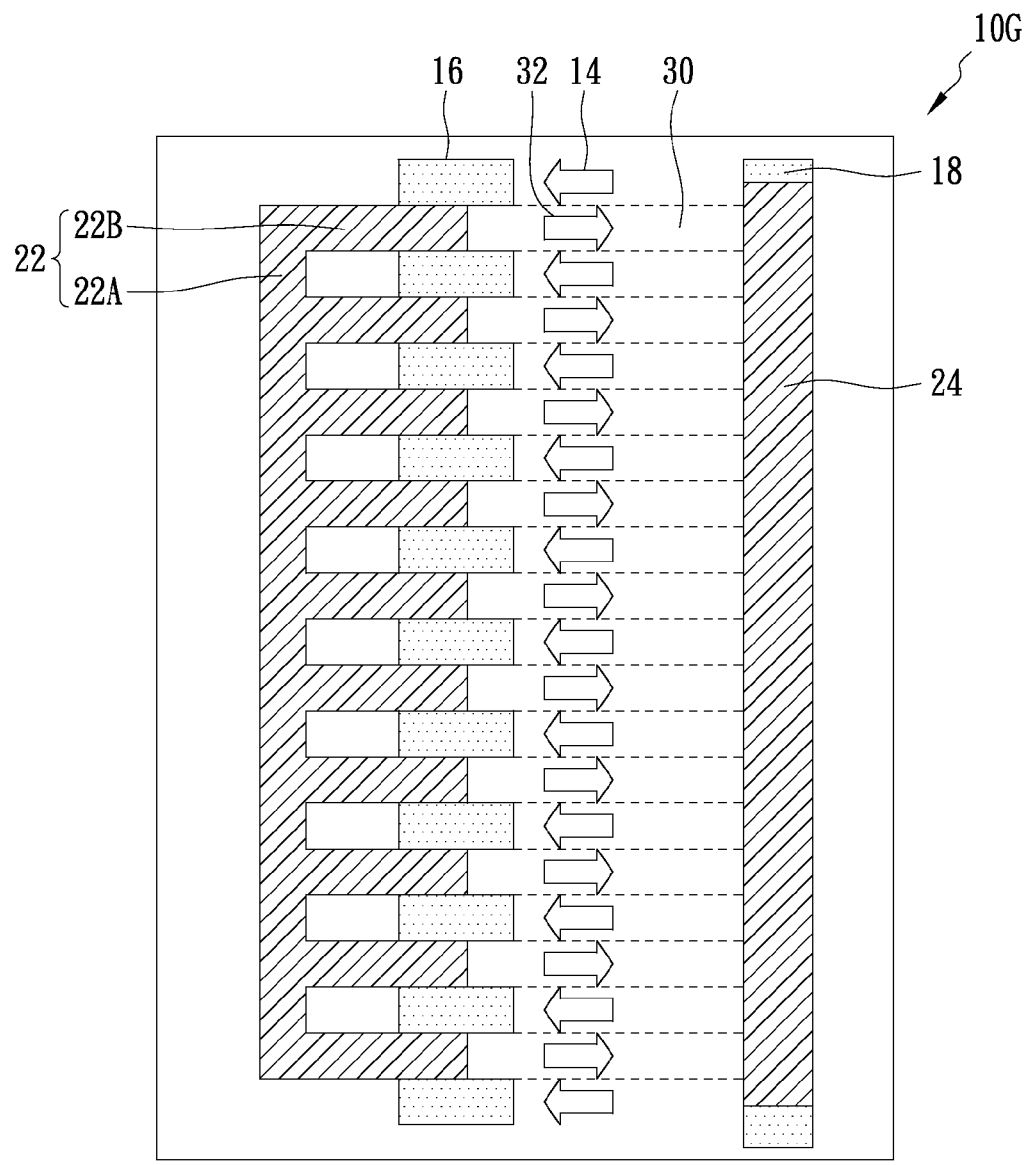
Figure 21:
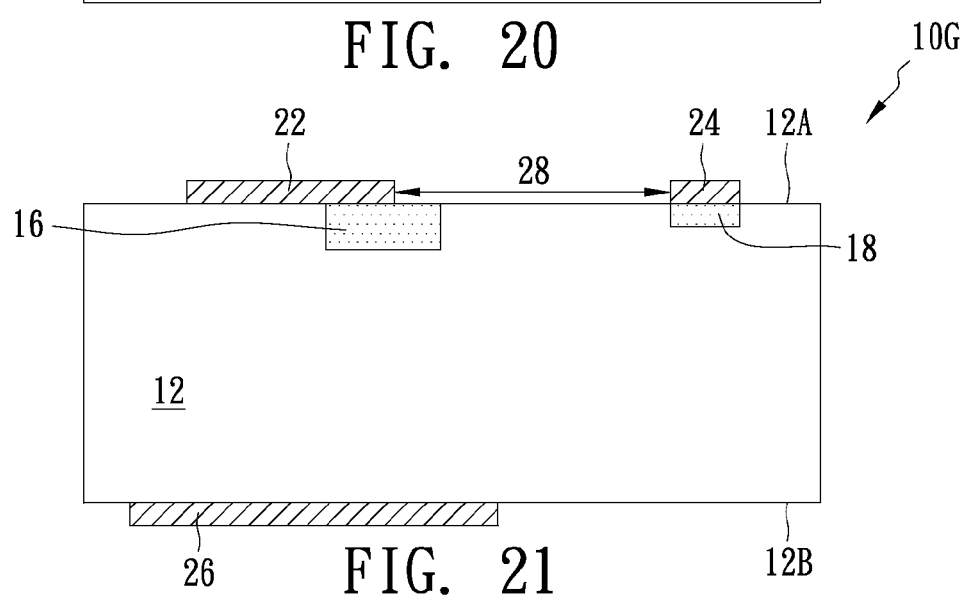

FIG. 20 and FIG. 21 illustrate a poled structure 10I according to the ninth embodiment of the present invention. FIG. 20 is a top view of the poled structure 10I and FIG. 21 is a cross-sectional view of the poled structure 10I. Compared with the prepared poled structure 10A in FIG. 5, the first electrode 22 of the poled structure 10I includes a plurality of combs 22B, the doping process forms a plurality of inhibition blocks 16 between the combs 22B and a strip-shaped inhibition block 18 in the ferroelectric substrate 12, and the second electrode 24 is formed on the strip-shaped inhibition block 18. In particular, the strip-shaped inhibition blocks 16 between the combs 24B of the positive electrode 22 can inhibit over-poling and the strip-shaped inhibition block 18 under the negative electrode 24 can increase the internal field to help the formulation of inverted domains 30 uniformly.

The above-described embodiments of the present invention are intended to be illustrative only. Numerous alternative embodiments may be devised by those skilled in the art without departing from the scope of the following claims.

What is claimed is:

1. A poled structure, comprising:
a ferroelectric substrate with a first polarization direction and a first crystal structure, and the ferroelectric substrate having a top surface and a bottom surface;
at least one inhibition block positioned in the ferroelectric substrate, and the inhibition block having a second crystal structure different from the first crystal structure; and
an electrode structure including a first electrode and a second electrode on the top surface and a third electrode in a portion of the bottom surface between the first electrode and the second electrode.

2. The poled structure as claimed in claim 1, wherein the inhibition block is formed in an upper portion of the ferroelectric substrate.

3. The poled structure as claimed in claim 1, wherein the first electrode is a positive electrode including a plurality of combs, the second electrode is a strip-shaped negative electrode, and the doping process forms a plurality of inhibition blocks between the combs of the first electrode.

4. The poled structure as claimed in claim 3, wherein the first electrode and the second electrode are separated by a poling area, and the inhibition blocks cover a portion of the poling area near the first electrode.

5. The poled structure as claimed in claim 1, wherein the first electrode includes a plurality of combs, the second electrode includes a plurality of combs, and a plurality of inhibition blocks are positioned between the combs.

6. The poled structure as claimed in claim 5, wherein the first electrode and the second electrode are separated by a poling area, and the inhibition blocks cover a portion of the poling area.

7. The poled structure as claimed in claim 1, wherein the first electrode is a strip-shaped positive electrode, the second electrode is a negative electrode including a plurality of combs, and a plurality of inhibition blocks are positioned between the combs of the second electrode.

8. The poled structure as claimed in claim 7, wherein the first electrode and the second electrode are separated by a poling area, and the inhibition blocks cover a portion of the poling area.

9. The poled structure as claimed in claim 1, wherein the first electrode is a positive electrode including a plurality of combs, the second electrode is a strip-shaped negative electrode, and an inhibition block is positioned near the second electrode.

10. The poled structure as claimed in claim 9, wherein the first electrode and the second electrode are separated by a poling area, and the inhibition block is a strip-shaped inhibition block covers a portion of the poling area near the second electrode.

11. The poled structure as claimed in claim 1, wherein the first electrode is a positive electrode including a plurality of combs, the second electrode is a strip-shaped negative electrode, and a plurality of first inhibition blocks are positioned between the combs and a second inhibition block near the second electrode.

12. The poled structure as claimed in claim 11, wherein the first electrode and the second electrode are separated by a poling area, and the first inhibition blocks covers a portion of the poling area near the first electrode and the second inhibition block covers a portion of the poling area near the second electrode.

13. The poled structure as claimed in claim 1, wherein the first electrode includes a plurality of combs, the second electrode includes a plurality of combs, and a plurality of first inhibition blocks are positioned between the combs of the first electrode and a second inhibition block is positioned near the second electrode.

14. The poled structure as claimed in claim 13, wherein the first electrode and the second electrode are separated by a poling area, and the first inhibition blocks covers a portion of the poling area near the first electrode and the second inhibition block covers a portion of the poling area near the second electrode.

15. The poled structure as claimed in claim 1, wherein the first electrode includes a plurality of combs, a strip-shaped inhibition block is positioned in the ferroelectric substrate, and the second electrode is formed on the strip-shaped inhibition block.

16. The poled structure as claimed in claim 1, wherein the first electrode includes a plurality of combs, a plurality of inhibition blocks are positioned in the ferroelectric substrate, and the second electrode is formed on the inhibition blocks.

17. The poled structure as claimed in claim 1, wherein the first electrode includes a plurality of combs, a plurality of first inhibition blocks are positioned between the combs and a second inhibition block is positioned in the ferroelectric substrate, and the second electrode is formed on the second inhibition block.

18. The poled structure as claimed in claim 1, wherein the ferroelectric substrate includes a trench on the top surface.

19. The poled structure as claimed in claim 1, further comprising a plurality of inverted domains positioned outside of the inhibition block in the ferroelectric substrate, and the inverted domains having a second polarization direction substantially opposite to the first polarization direction.

* * * * *